(12) United States Patent
Feng

(10) Patent No.: US 10,305,963 B2
(45) Date of Patent: May 28, 2019

(54) METHOD AND SYSTEM FOR FILE SHARING BROWSE

(71) Applicants: BEIJING KINGSOFT OFFICE SOFTWARE, INC., Beijing (CN); ZHUHAI KINGSOFT OFFICE SOFTWARE CO., LTD., Jida Zhuhai, Guangdong (CN)

(72) Inventor: Yanshan Feng, Jida Zhuhai (CN)

(73) Assignees: BEIJING KINGSOFT OFFICE SOFTWARE, INC., Beijing (CN); ZHUHAI KINGSOFT OFFICE SOFTWARE CO., LTD., Jida Zhuhai, Guangdong (CN)

(*) Notice: Subject to any disclaimer, the term of this patent is extended or adjusted under 35 U.S.C. 154(b) by 179 days.

(21) Appl. No.: 15/108,163

(22) PCT Filed: Nov. 25, 2014

(86) PCT No.: PCT/CN2014/092189
§ 371 (c)(1),
(2) Date: Jun. 24, 2016

(87) PCT Pub. No.: WO2015/096577
PCT Pub. Date: Jul. 2, 2015

(65) Prior Publication Data
US 2016/0330268 A1    Nov. 10, 2016

(30) Foreign Application Priority Data

Dec. 25, 2013    (CN) .......................... 2013 1 0728805

(51) Int. Cl.
*G06F 15/16*    (2006.01)
*H04L 29/08*    (2006.01)
*H04L 29/06*    (2006.01)

(52) U.S. Cl.
CPC .......... *H04L 67/06* (2013.01); *H04L 65/4015* (2013.01); *H04L 67/125* (2013.01)

(58) Field of Classification Search
CPC .... H04L 67/06; H04L 65/4015; H04L 67/125
(Continued)

(56) References Cited

U.S. PATENT DOCUMENTS

| | | | |
|---|---|---|---|
| 9,078,499 B1* | 7/2015 | Brabec | A45C 11/16 |
| 2007/0136579 A1* | 6/2007 | Levy | H04L 63/102 |
| | | | 713/168 |

(Continued)

FOREIGN PATENT DOCUMENTS

| | | | |
|---|---|---|---|
| CN | 103023873 | * | 4/2013 |
| CN | 103023873 A | | 4/2013 |

(Continued)

*Primary Examiner* — Krisna Lim
(74) *Attorney, Agent, or Firm* — David W. Carstens; J. Andrew Reed; Carstens & Cahoon, LLP

(57) ABSTRACT

Embodiments of the present application disclose a file shared browsing method and system. The method comprises: a host device receiving a browsing mode switching operation of a user, and enabling or disabling a slave mode of the system according to the operation, wherein: global control permission on a target file browsing progress for a slave device is enabled in a state in which the slave mode of the system is ON; global control permission on the target file browsing progress for a slave device is disabled in a state in which the slave mode of the system is OFF. Compared to the prior art, the user of the slave device in the embodiments of the present application can, in addition to passively follow the browse, also temporarily become dominant for browsing according to actual needs. Thus, the solution of the present application can be flexibly adapted to application of different scenes, such as a solo speech and multi-person discussion and the like.

20 Claims, 3 Drawing Sheets

(58) Field of Classification Search
USPC .......................................................... 709/209
See application file for complete search history.

(56) References Cited

U.S. PATENT DOCUMENTS

| 2013/0063221 A1* | 3/2013 | Biber | H04B 1/28 |
| | | | 333/25 |
| 2013/0268357 A1* | 10/2013 | Heath | H04L 63/00 |
| | | | 705/14.53 |
| 2014/0040978 A1* | 2/2014 | Barton | H04L 63/20 |
| | | | 726/1 |

FOREIGN PATENT DOCUMENTS

| JP | 2001243195 A | 9/2001 |
| JP | 2012155672 A | 8/2012 |

* cited by examiner

METHOD AND SYSTEM FOR FILE SHARING BROWSE

The present application is the U.S. national phase of International Application No. PCT/CN2014/092189 filed Nov. 25, 2014, which designated the U.S. and claims priority to Chinese patent application No. 201310728805.3, entitled "Document sharing browsing method and system" and filed before China Patent Office on Dec. 25, 2013, the entire content of which is incorporated in the present application by reference.

TECHNICAL FIELD

The present application relates to the field of network application technology, and particularly relates to a file shared browsing method and system.

BACKGROUND

With the development of network technology, some activity scenes, such as conferences, teaching, multi-player games, in which interaction among multiple players is required can be implemented in a network environment. The network environment described here refers to a plurality of devices interconnected in a certain manner (comprising physical connection and logical connection), each user uses his/her own device and communicates with other devices by means of specific programs installed in his/her own device, thereby realizing various multi-user interactive applications.

"File shared browsing" is a common multi-user oriented service, its basic function is to enable, when a user is browsing a file (such as a slide, video and so on), other users in the same network environment with this user to browse this file, and to enable synchronized browsing progress among multiple users.

According to an implementation in prior art, in a file shared browsing system, each device is provided with permission to control the file browsing progress, and when a user of one device changes the file browsing progress, browsing progress on other devices will synchronously be changed as well. This implementation is suitable for application scenes such as conference and discussion and the like, but the existing problem thereof is a relatively large interference between different users, i.e., once a user changes the browsing location of the current file, it is likely to influence normal browsing for other users.

In view of above, another solution in prior art is to provide one host device and several slave devices in a file shared browsing system, wherein, the host device is provided with permission to control file browsing progress while the slave devices can merely browse the file synchronously with the progress of the host device. This solution has solved the interference problem among different users, and is suitable for application scenes such as solo teaching, speeches and so on. However, slave devices in turn can merely passively follow the browsing, which is difficult to satisfy the application requirements that need multiple users to interact.

SUMMARY

In order to solve the above problems, embodiments of the present application provide a file shared browsing method and system. The specific technical solutions are as follows.

The embodiments of the present application provide a file shared browsing method, which comprises:

a host device receiving a browsing mode switching operation of a user, and enabling or disabling a slave mode of a file shared browsing system according to the operation, wherein:

global control permission on a target file browsing progress for a slave device is enabled in a state in which the slave mode of the system is ON;

global control permission on the target file browsing progress for a slave device is disabled in a state in which the slave mode of the system is OFF.

Embodiments of the present application also provide a file shared browsing system, which comprises one host device and at least one slave device that browse one and the same target file, the host device and the slave device browsing one and the same target file;

the host device comprises an operation receiving module, a mode enabling control module and a mode disabling control module, the operation receiving module is used for triggering a corresponding control module according to a browsing mode switching operation of a user, the browsing mode switching operation including an enabling operation and a disabling operation;

the mode enabling control module is used for enabling a slave mode of the system according to the mode enabling operation of the user, wherein, global control permission on a target file browsing progress for a slave device is enabled in a state here the slave mode of the system is ON;

the mode disabling control module is used for disabling the slave mode of the system according to the mode disabling operation of the user, wherein, global control permission on the target file browsing progress for a slave device is disabled in a state in which the slave mode of the system is OFF.

An embodiments of the present application also provides a storage medium, wherein, the storage medium is used to store an application program for carrying out, when executed, the file shared browsing method of the present application.

An embodiments of the present application also provides an application program, wherein, it is used for carrying out, when executed, the file shared browsing method of the present application.

The technical solution provided by the embodiments of the present application provides a slave mode for the file shared browsing system, and the enabling or the disabling of the slave mode is controlled by the host device. When the slave mode is ON, a slave device obtains global control permission on a target file browsing progress. Compared to the prior art, the user of the slave device in the embodiments of the present application can, in addition to passively follow the browse, also temporarily become dominant for browsing according to actual needs. Thus, the solution of the present application can be flexibly adapted to application of different scenes, such as a solo speech and multi-person discussion and the like.

BRIEF DESCRIPTION OF THE DRAWINGS

In order to describe embodiments of the present invention or technical solutions in prior art more clearly, drawings used for describing embodiments of the present invention or the prior art will be described briefly below. It is obvious that the drawings below are for only some embodiments of the present invention, and those skilled in the art can obtain further drawings based on these drawings without creative efforts.

DETAILED DESCRIPTION

Figure 1:
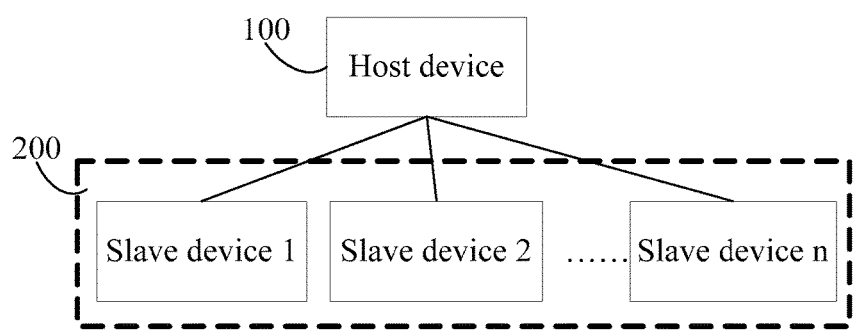
FIG. 1 is a schematic structural view of a file shared browsing system of an embodiment of the present application.

Referring to FIG. 1, the technical solution provided by an embodiment of the present application is applicable to a file shared browsing system comprising one host device 100 and at least one slave device 200. The host device and the slave device communicate with each other in a certain manner, such as by local networking or via Internet connection and the like. The hardware configuration of the host device and the slave device can be identical or different, and the hardware configuration can specifically be PC machines, laptops, mobile terminals, tablets and other forms.

The host device and slave device may browse one and the same file in a certain time period. The file referred to here can be of a type such as text, video, slide show and the like, and this file can be stored in a server on network side, or can also be stored in the host device or the slave device. Moreover, no matter where the file is stored originally, duplicates of the file are allowed to be stored locally and are collectively identified as one file by a certain identifier. To facilitate the description, the file browsed simultaneously by a plurality of devices is called "target file" hereinafter.

Wherein, the host device is provided with global control permission on the target file browsing progress by default. That is to say, after a user of the host device performs a progress control operation (such as playing video, switching slide, etc) on the target file on the host device, other slave devices in the system will follow the operation performed on the host device and display synchronously and locally the same content as the host device does. This manner is applicable to application scenes such as solo teaching or speech and the like. When a teacher or a speaker, as the user of the host device, controls the file browsing progress, audiences (users of slave devices) can also see the changes of file browsing progress at the same time. However, in this case, users of slave devices can only passively follow the browsing, which is difficult to satisfy some application requirements that need interaction among a plurality of users.

In view of the above problem, the embodiments of the present application provide solutions for the host device side and for the slave device side respectively, which will be described below respectively.

Figure 2:
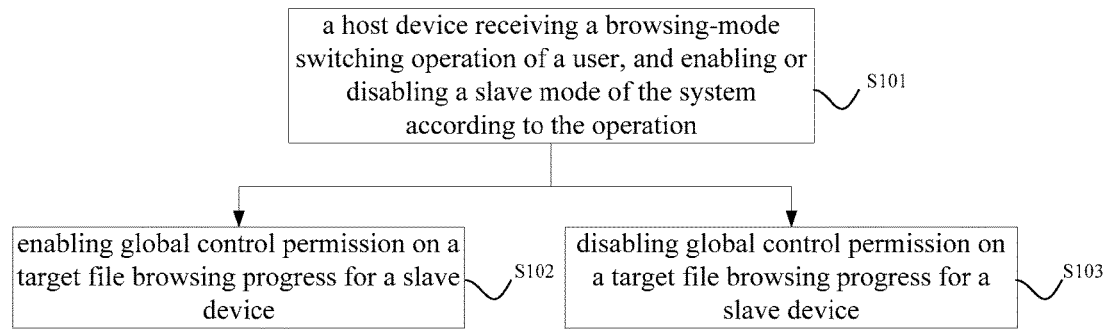
FIG. 2 is a flow chart of a file shared browsing method of an embodiment of the present application.

As shown in FIG. 2, which is a file shared browsing method applied to the host device side provided by an embodiment of the present application, this method can comprise the following steps of:

S101, a host device receiving a browsing-mode switching operation of a user, and enabling or disabling a slave mode of the system according to the operation;

S102, in a state in which the slave mode of the system is ON, enabling global control permission on a target file browsing progress for a slave device;

S103, in a state in which the slave mode of the system is OFF, disabling the global control permission on the target file browsing progress for a slave device.

The above file shared browsing method provides the file shared browsing system with a "slave mode", wherein, after the slave mode is ON, one or more slave devices in the system can temporarily obtain the global control permission on the target file browsing progress. The host device can flexibly control whether any one of slave devices is provided with the global control permission on the target file browsing progress according to users' operation.

According to a specific implementation of the present application, the host device can enable the global control permission on the target file browsing progress for all the slave devices in the system at the same time. Accordingly, the host device can also disable the global control permission on the target file browsing progress for all the slave devices in the system at the same time.

In a typical application scene, a teacher (the user of the host device) firstly leads students (users of slave devices) to browse through the whole lecture slides, and then the teacher enables the slave mode and the class enters into a free discussion session. At this moment each student can express his/her opinions on some part of the slide, when a student switches to a page of the slide, devices of other students and of the teacher will synchronously display this page. After the free discussion session is finished, the teacher can disable the slave mode, after which students will not be able to globally control the switching of the slide.

After enabling the slave mode, the host device can temporarily disable its own global control permission on browsing according to actual needs, and the permission can be recovered after the host device disables the slave mode.

According to a specific implementation of the present application, a host device can also selectively enable the global control permission on a target file browsing progress for one or more slave devices in the system at the same time. When activating slave mode, the user of the host device can select the identifier of a slave device for which the permission needs to be enabled, thus enabling the global control permission for the specified device and avoiding interference between a plurality of devices.

A typical application scene is a question session in class. If a teacher wishes to specify a student to answer a question, he/she enables the global control permission on a target file browsing progress for the device of the student. Then, the student can answer the question with reference to some part of the slides and other students will not be able to control the browsing progress of the target file. After the student finishes answering the question, the teacher can disable the slave mode.

According to practical needs, after the host device enables the slave mode, it can have global control permission on the target file browsing progress. For example, the teacher can discuss some part of the slides with the student answering the question; and the teacher can also temporarily disable his/her global control permission, thus avoiding interfering with the student answering the question.

Besides, no matter which manner a host device adopts, i.e. the manner of "enabling global control permission on a target file browsing progress for all the slave devices in the system" or the manner of "selectively enabling global control permission on a target file browsing progress for one or more slave devices in the system", the host device can, according to the instruction of the user, disable the control permission for some of slave devices among a plurality of the slave devices that have acquired control permission. It should be understood that the system is still in a state in which the slave mode is ON after control permission for some of the slave devices is disabled. When the control permission for all the slave devices is disabled, the system will enter into a state in which the slave mode is OFF.

The above solution provides a slave mode for a file shared browsing system and controls the enabling and disabling of the slave mode through a host device. When the slave mode is ON, a slave device obtains the global control permission on a target file browsing progress. Compared to the prior art, in addition to passively following the browse, a user of the slave device in the solution of the present application can also temporarily become dominant for browsing according to actual needs. Thus, the solution of the present application can be flexibly adapted to application of different scenes, such as a solo speech and multi-person discussion and the like.

Figure 3:
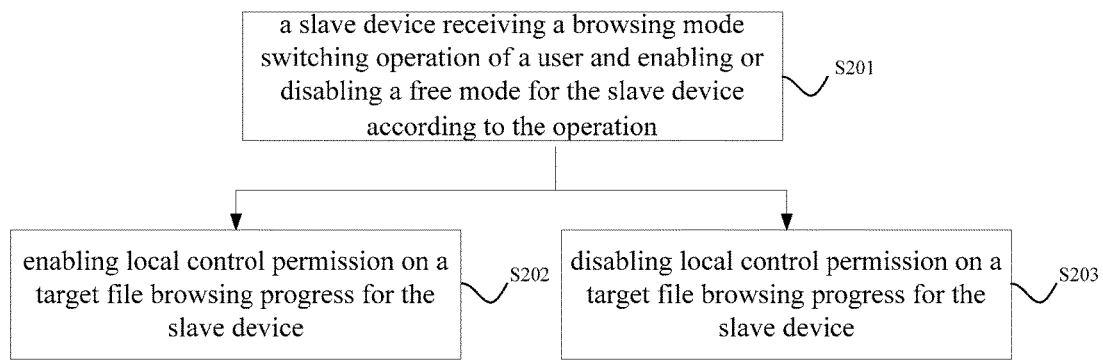
FIG. 3 is a second flow chart of a file shared browsing method of an embodiment of the present application.

In addition to the solution applied to host device side, the embodiment of the present application also provides a solution applied to slave device side. As shown in FIG. 3, which is a file shared browsing method applied to slave device side provided by an embodiment of the present application, the method can comprise the following steps of:

S201, a slave device receiving a browsing mode switching operation of a user and enabling or disabling a free mode for the slave device according to the operation;

S202, in a state in which the free mode of the system is ON, enabling local control permission on a target file browsing progress for the slave device;

S203, in a state in which the free mode of the system is OFF, disabling local control permission on a target file browsing progress for the slave device.

The above file shared browsing method provides the slave device in a file shared browsing system with a "free mode". When the free mode is on, the slave device obtains local control permission on a target file browsing progress. By enabling or disabling the free mode of the slave device, the user of the slave device can flexibly select between "following the host device to browse" and "positively browsing". Wherein, the local control permission for each slave device is independent, that is to say, when any one of the slave devices changes the browsing progress of a target file locally, other slave devices and the host device will not be affected.

In a specific implementation of the present application, a slave device can enable local control permission on a target file browsing progress for the slave device while the global control permission on the target file browsing progress by the host device is maintained.

In a typical application scene, a slave device, after enabling the free mode, locally provides two display interfaces for, wherein:

a first interface is used for displaying global control results of the target file browsing progress by the host device;

a second interface is used for displaying corresponding results according to the control operation of the user of the slave device on the target file browsing progress.

Figure 4:
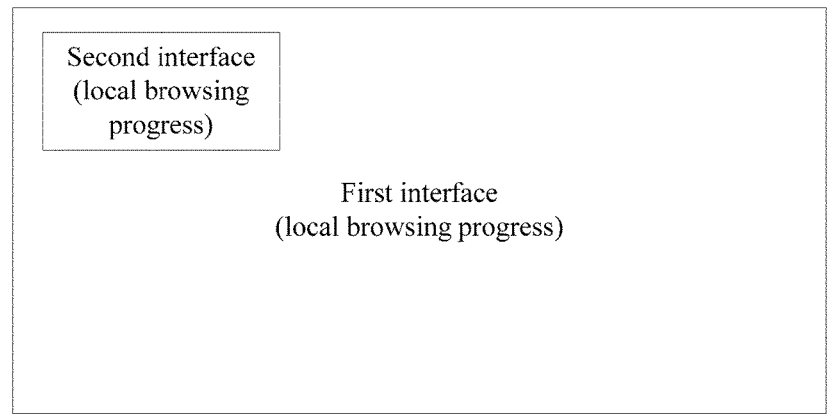
FIG. 4 is a schematic view of the display interface of a slave device of an embodiment of the present application.

In practical applications, the above two interfaces can be two windows displaying in parallel, or can also be two windows that are switched and displayed according to the user's operation. In a specific implementation of the present application, the second interface can take most of the display space on the screen, while the first interface overlies the second interface in the form of a "small screen", as shown in FIG. 4. In this way, the user of a slave device can, on one hand, flexibly browse target files according to their needs, and, on the other hand, can view the browsing progress of a host device at any time, so as to avoid being unable to catch up with progress of the class or conference. After the user of the slave device selects to disable the free browsing mode of the slave device, the slave device can hide the second interface from the displayed contents, and in this way, the slave device will switch back to a browsing mode completely to follow the host device again.

The above solution provides a slave device in a file shared browsing system with a "free mode". When this free mode is ON, a slave device obtains local control permission on a target file browsing progress. Compared to the prior art, in addition to passively following the browsing, a user of a slave device in the embodiment of the present application can, freely and locally browse as needed, which increases the flexibility of browsing for the user of a slave device and can satisfy the requirements of the users of a device better.

Corresponding to the above embodiments of the method, the present application also provides a file shared browsing system, which comprises one host and at least one slave device.

Figure 5:
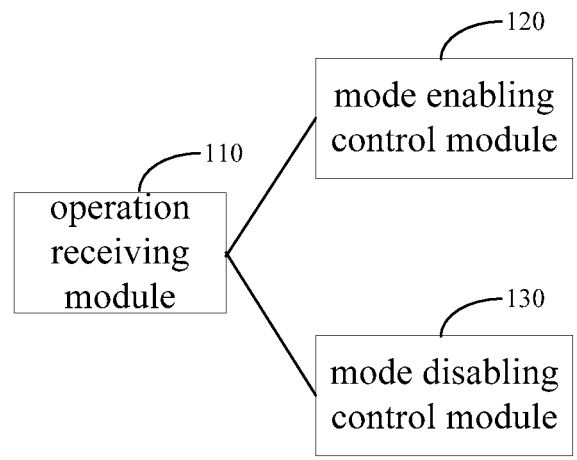
FIG. 5 is a schematic structural view of a host device of an embodiment of the present application.

Referring to FIG. 5, the host device can comprise:

an operation receiving module 110, a mode enabling control module 120 and a mode disabling control module 130, the operation receiving module 110 is used for triggering a corresponding control module according to the browsing mode switching operation of a user, the browsing mode switching operation includes an enabling operation and a disabling operation;

the mode enabling control module 120 is used for enabling a slave mode of the system according to the mode enabling operation of a user, wherein, in a state in which the slave mode of the system is ON, global control permission on a target file browsing progress for a slave device is enabled;

the mode disabling control module 130 is used for disabling a slave mode of the system according to the mode disabling operation of a user, wherein, in a state in which the slave mode of the system is OFF, global control permission on the target file browsing progress for a slave device is disabled.

According to a specific implementation of the present application, the mode enabling control module 120 can be specifically used for:

enabling the global control permission on the target file browsing progress for all the slave devices in the system.

According to a specific implementation of the present application, in the case that the browsing mode switching operation of the user is an enabling operation, an identifier of at least one slave device can be specified in the enabling operation.

Correspondingly, the mode enabling control module 120 can be specifically used for enabling the global control permission on the target file browsing progress for a slave device according to the user-specified identifier of the corresponding slave device.

Figure 6:
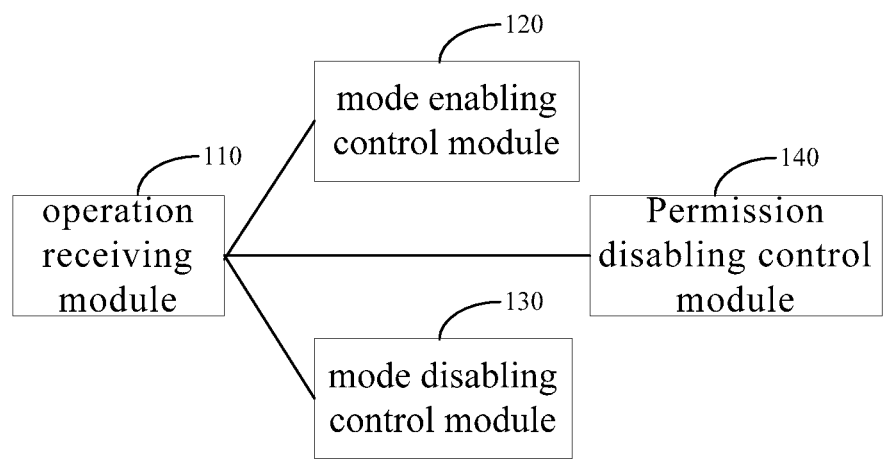
FIG. 6 is a second schematic structural view of a host device of an embodiment of the present application.

With reference to FIG. 6, the host device provided by the embodiment of the present application can further comprise:

a permission disabling control module 140, for disabling, in a state in which the slave mode of the system is ON, control permission for some of the slave devices according to identifiers of slave devices provided by a user among a plurality of slave devices that have acquired the control permission.

In a specific implementation of the present application, the mode enabling control module 110 can also be used for disabling the global control permission on the target file browsing progress for the host device according to the mode enabling operations of the user.

Correspondingly, the mode disabling control module 120 can also be used for enabling the global control permission on the target file browsing progress for the host device according to the mode disabling operations of the user.

The above solution provides a slave mode for a file shared browsing system and controls the enabling and disabling of this slave mode through a host device. When this slave mode is ON, a slave device obtains global control permission on a target file browsing progress. Compared to the prior art, in addition to passively following the browsing, the user of a slave device in the solution of the present application can also temporarily become dominant for browsing according to actual needs. Thus, the solution of the present application can be flexibly adapted to applications of different scenes such as solo speech and multi-person discussion, etc.

Figure 7:
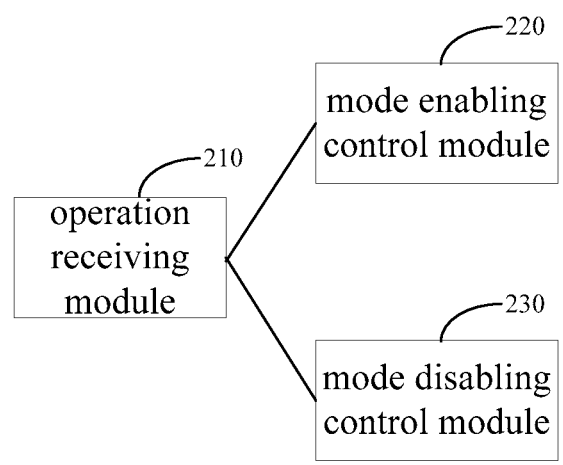
FIG. 7 is a schematic structural view of a slave device of an embodiment of the present application.

FIG. 7 shows a schematic structural view of a slave device provided by an embodiment of the present application, which can comprise:

an operation receiving module 210, a mode enabling control module 220 and a mode disabling control module 230;

the operation receiving module 210 is used for receiving a browsing mode switching operation of a user and triggering a corresponding control module according to the operation, the browsing mode switching operation includes an enabling operation and a disabling operation;

the mode enabling control module 220 is used for enabling local control permission on the target file browsing progress for the slave device according to the mode enabling operation of the user;

the mode disabling control module 230 is used for disabling a local control permission on the target file browsing progress for the slave device according to the mode disabling operation of the user.

According to a specific implementation of the present application, the mode enabling control module 220 can be specifically used for:

enabling local control permission on the target file browsing progress for the slave device, while the global control permission on the target file browsing progress by a host device is maintained.

The mode enabling control module 120 can provide two display interfaces locally, wherein:

a first interface is used for displaying global control results of the target file browsing progress by the host device;

a second interface is used for displaying corresponding results according to the control operation of the user of the slave device on the target file browsing progress.

In actual applications, the above two interfaces can be two windows displaying in parallel, or can also be two windows that are switched and displayed according to the user's operation. In a specific implementation of the present application, the second interface can take most of the display space on the screen, while the first interface overlies the second interface in the form of a "small screen", as shown in FIG. 4. In this way, a user of a slave device can, on one hand, flexibly browse a target file according to his/her needs, and on the other hand can see the browsing progress of the host device at any time, so as to avoid being unable to catch up with progress of the class or conference. After a user of a slave device selects to disable the free browsing mode of the slave device, the slave device can hide the second interface from the displayed contents, and in this way, the slave device will switch back to a browsing mode completely to follow the host device again.

The above solution provides a slave device in a file shared browsing system with a "free mode". When the free mode is ON, a slave device obtains local control permission on a target file browsing progress. Compared to the prior art, in addition to passively following the browse, the user of a slave device in the embodiments of the present application can also browse freely and locally as needed, which increases the flexibility of browsing for the user of the slave device and can satisfy the requirements of the user of the device better.

It should be understood that, the file shared browsing solutions on host device side and on slave device side provided by embodiments of the present application can be implemented independently so as to resolve the existing problem that slave devices are not flexible enough, and can also be implemented in combination with each other. That is to say, solutions on host device side and on slave device side respectively are used in one and the same file shared browsing system, wherein the host device can select to enable or disable global control permission on the browsing progress for a slave device, while a slave device can choose whether to follow the browsing progress of the host device. In this way, it further improves flexibility of control permission on the browsing progress so as to adapt to more application scenes.

It can be known from the above description of the embodiments that, a person skilled in the art can clearly know that the present application can be implemented by means of software as well as the required general hardware platforms. Based on this understanding, the technical solutions of the present application essentially or the part which contributes to the prior art can be embodied in the form of a software product, and the computer software product can be stored in a storage medium, such as ROM/RAM, a disk, an optical disk, etc, which comprises several instructions for enabling a computer device (can be a PC, a server, or a network device, etc) to implement methods described in various embodiments of the present application or a part of embodiments.

Embodiments of the present application also provide a storage medium, wherein the storage medium is used to store an application program, the application program is used for carrying out, when executed, a file shared browsing method of the present invention applied to host device side or a file shared browsing method applied to slave device side.

Embodiments of the present application also provide an application program for carrying out, when executed, a file shared browsing method of the present invention applied to host device side or a file shared browsing method applied to slave device side.

Various embodiments in the present description are described progressively, the same or similar parts between various embodiments can refer to each other, and the description of each embodiment emphasizes the difference with other embodiments. Particularly, the system embodiments are briefly described since they are similar to the method embodiments, and the relevant parts can refer to the part of the description of the method embodiments. The system embodiments described above are only illustrative, wherein the units described as separated components may or may not be physically separated, the components displayed as a unit may or may not be a physical unit, i.e., can be in one location, or can be distributed in a plurality of network units. The objectives of the solutions of the present embodiments can be realized by selecting a part thereof or all modules according to practical needs. It can be understood and implemented by those of ordinary skill in the art without any creative effort.

The description above is merely the specific implementation of the present application, and it should be noted that improvements and modifications can be made by those of ordinary skill in the art without departing from the principles of the present application and the improvements and modifications should be deemed as the protection scope of the present application.

What is claimed is:

1. A file shared browsing method, which is applicable to a file shared browsing system comprising one host device and at least one slave device that browse one and the same target file, wherein the method comprises:
   the host device receiving a first browsing mode switching operation of a user, and enabling or disabling a slave mode of the system according to the operation, wherein:
   global control permission on a target file browsing progress for a slave device is enabled in a state in which the slave mode of the system is ON;
   global control permission on the target file browsing progress for a slave device is disabled in a state in which the slave mode of the system is OFF; and
   a slave device receiving a second browsing mode switching operation of a user and enabling or disabling a free mode for the slave device according to the second browsing mode switching operation, wherein:
   local control permission on a target file browsing progress for the slave device is enabled in a state in which the free mode of the system is ON;
   local control permission on the target file browsing progress for the slave device is disabled in a state in which the free mode of the system is OFF; and wherein
   in the state in which the free mode is ON, the slave device enables local control permission on a target file browsing progress for the slave device while the global control permission on the target file browsing progress by the host device is maintained.

2. The method according to claim 1, wherein, enabling global control permission on the target file browsing progress for a slave device is specifically implemented by:
   enabling the global control permission on the target file browsing progress for all the slave devices in the system.

3. The method according to claim 1, wherein,
   the first browsing mode switching operation of the user is an enabling operation, in which an identifier of at least one slave device is specified;
   enabling the global control permission on the target file browsing progress for a slave device is specifically implemented by: enabling the global control permission on the target file browsing progress for a slave device according to a user-specified identifier of the corresponding slave device.

4. The method according to claim 2, wherein it also comprises:
   disabling the global control permission on the target file browsing progress for the host device in a state in which the slave mode of the system is ON;
   enabling the global control permission on the target file browsing progress for the host device in a state in which the slave mode of the system is OFF.

5. The method according to claim 2, wherein it also comprises:
   in a state in which the slave mode of the system is ON, disabling, according to identifiers of slave devices provided by the user, the control permission for some slave devices among a plurality of slave devices that have acquired the control permission.

6. The method according to claim 3, wherein it also comprises:
   in a state in which the slave mode of the system is ON, disabling, according to identifiers of slave devices provided by the user, the control permission for some slave devices among a plurality of slave devices that have acquired the control permission.

7. The method according to claim 3, wherein it also comprises:
   disabling the global control permission on the target file browsing progress for the host device in a state in which the slave mode of the system is ON;
   enabling the global control permission on the target file browsing progress for the host device in a state in which the slave mode of the system is OFF.

8. The method according to claim 1, wherein it also comprises:
   in a state in which the slave mode of the system is ON, disabling, according to identifiers of slave devices provided by the user, the control permission for some slave devices among a plurality of slave devices that have acquired the control permission.

9. The method according to claim 1, wherein it also comprises:
   disabling the global control permission on the target file browsing progress for the host device in a state in which the slave mode of the system is ON;
   enabling the global control permission on the target file browsing progress for the host device in a state in which the slave mode of the system is OFF.

10. A storage medium, wherein it is used to store an application program, the application program being used for carrying out the file shared browsing method according to any one of claims 1 to 9 when executed.

11. An application program, wherein it is used for carrying out, the file shared browsing method according to any one of claims 1 to 9 when executed.

12. A file shared browsing system, wherein it comprises one host device and at least one slave device that browse one and the same target file;
   the host device comprises a first operation receiving module, a first mode enabling control module and a first mode disabling control module,
   the first operation receiving module is used for triggering a corresponding control module according to a first browsing mode switching operation of a user, the first browsing mode switching operation including a first enabling operation and a first disabling operation;
   the first mode enabling control module is used for enabling a slave mode of the system according to the first enabling operation of the user, wherein, global control permission on a target file browsing progress for a slave device is enabled in a state in which the slave mode of the system is ON;
   the first mode disabling control module is used for disabling the slave mode of the system according to the first disabling operation of the user, wherein, the global control permission on the target file browsing progress for a slave device is disabled in a state in which the slave mode of the system is OFF; and the at least one salve device comprise a second operation receiving module, a second mode enabling control module, and a second mode disabling control module; wherein the second operation receiving module is used for receiving a second browsing mode switching operation of a user and triggering a corresponding control module according to the operation, the second browsing mode switching operation comprising a second enabling operation and a second disabling operation;

the second mode enabling control module is used for enabling local control permission on the target file browsing progress for the slave device according to the second enabling operation;

the second mode disabling control module is used for disabling local control permission on the target file browsing progress for the slave device according to the second disabling operation, wherein the slave device enables the local control permission on the target file browsing progress for the slave device, while the global control permission on the target file browsing progress by the host device is maintained.

13. The system according to claim 12, wherein, the first mode enabling control module is specifically used for:

enabling the global control permission on the target file browsing progress for all the slave devices in the system.

14. The system according to claim 13, wherein it also comprises:

a permission disabling control module, for disabling, according to identifiers of slave devices provided by the user, the control permission for some slave devices among a plurality of slave devices that have acquired the control permission, in a state in which the slave mode of the system is ON.

15. The system according to claim 13, wherein:

the first mode enabling control module is also used for disabling the global control permission on the target file browsing progress for the host device according to the first enabling operation of the user;

the first mode disabling control module is also used for enabling the global control permission on the target file browsing progress for the host device according to the first disabling operation of the user.

16. The system according to claim 12, wherein, the first browsing mode switching operation of the user is an enabling operation, in which an identifier of at least one slave device is specified;

the first mode enabling control module is specifically used for enabling the global control permission on the target file browsing progress for a slave device according to a user-specified identifier of the corresponding slave device.

17. The system according to claim 16, wherein it also comprises:

a permission disabling control module, for disabling, according to identifiers of slave devices provided by the user, the control permission for some slave devices among a plurality of slave devices that have acquired the control permission, in a state in which the slave mode of the system is ON.

18. The system according to claim 16, wherein:

the first mode enabling control module is also used for disabling the global control permission on the target file browsing progress for the host device according to the first enabling operation of the user;

the first mode disabling control module is also used for enabling the global control permission on the target file browsing progress for the host device according to the first disabling operation of the user.

19. The system according to claim 12, wherein it also comprises:

a permission disabling control module, for disabling, according to identifiers of slave devices provided by the user, the control permission for some slave devices among a plurality of slave devices that have acquired the control permission, in a state in which the slave mode of the system is ON.

20. The system according to claim 12, wherein:

the first mode enabling control module is also used for disabling the global control permission on the target file browsing progress for the host device according to the fit enabling operation of the user;

the first mode disabling control module is also used for enabling the global control permission on the target file browsing progress for the host device according to the first disabling operation of the user.

\* \* \* \* \*